H. B. Walker,
Silvering Glass.

No. 110,408.          Patented Dec. 20, 1870.

Witnesses:          Inventor:
W. Hornfager          H. B. Palmer Walker
Benj. Armstrong

UNITED STATES PATENT OFFICE.

HENRY BALEN WALKER, OF NEW YORK, N. Y.

IMPROVEMENT IN SILVERING GLASS.

Specification forming part of Letters Patent No. 110,408, dated December 20, 1870.

*To all whom it may concern:*

Be it known that I, HENRY BALEN WALKER, of the city, county, and State of New York, have invented certain Improvements in the Construction of a Glass-Silvering Plating-Stool to be used in the process of silvering glass, under a process for which I have made application for Letters Patent.

The nature and object of the invention is the making and constructing a stool of glass, or a combination of wood and glass or metal.

The top of the stool is made of wood, glass, or metal, of a circular, triangular, hexagonal, or octagonal form. The legs are made of triangular or cylindrical pieces of glass or metal. If made of metal, the points must be plated with some metal that will not corrode by acids.

The object of the invention is a stool to be used in silvering glass under a process for which I have an application for Letters Patent pending. Upon the stools are placed weights to press down the irregularities of the glass to be plated evenly upon the silvering-table, the points of the stool resting upon the glass, so as to have the smallest possible amount of surface uncovered by the silvering process.

Figure 1:
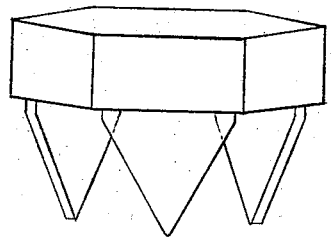
Figure 2:
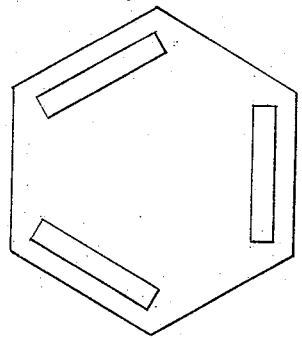
Figure 3:
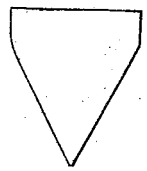

Figure 1 represents the stool. Fig. 2 represents the lower surface of the top of the stool. Fig. 3 represents one of the legs of the stool.

Having stated the nature and object of my invention, and reference being had to the drawing which constitutes part of these specifications, I proceed to give a general description, to enable others skilled in the art to make and use my invention.

A is the top of the stool, constructed either of wood or metal, in the lower surface of which are made oblong or circular sockets for inserting the legs. B, C, and D are the legs, made of triangular or other shaped pieces of glass or metal inserted in the sockets of the top.

I claim as my invention—

The making and constructing a stool made of wood and glass or wood and metal, or wholly of metal or glass, substantially in the manner and form as above described, and for the uses and purposes set forth, to be used in the process of silvering glass.

H. BALEN WALKER.

Witnesses:
W. S. HORNFAGER,
C. W. WALKER.